United States Patent

Ohlsen

[11] Patent Number: 6,099,000
[45] Date of Patent: Aug. 8, 2000

[54] CHAIR TRUCK TABLE ACCESSORY

[76] Inventor: Garry W. Ohlsen, 4008 Shalomar La., Georgetown, Calif. 95634

[21] Appl. No.: 09/044,319

[22] Filed: Mar. 19, 1998

[51] Int. Cl.[7] .................................................. B62B 1/00
[52] U.S. Cl. ........................................................ 280/47.28
[58] Field of Search ............................. 280/47.28, 47.27; 414/11; 248/453, 462, 465, 210, 211, 238, 237

[56] References Cited

U.S. PATENT DOCUMENTS

| 341,178 | 5/1886 | Specht | 182/45 |
|---|---|---|---|
| 2,028,133 | 1/1936 | Bowers | 254/3 |
| 2,893,577 | 7/1959 | Swanson | 214/372 |
| 3,612,565 | 10/1971 | Zimmerman | 280/47.24 |
| 3,655,212 | 4/1972 | Krass et al. | 280/36 R |
| 3,939,999 | 2/1976 | Nielson | 214/370 |
| 4,448,434 | 5/1984 | Anderson | 280/40 |
| 4,470,571 | 9/1984 | Hartman | 248/452 |
| 5,037,117 | 8/1991 | Hersgberger | 280/79.7 |
| 5,123,666 | 6/1992 | Moore | 280/47.28 |
| 5,228,824 | 7/1993 | Satoyoshi | 414/501 |
| 5,362,194 | 11/1994 | Kassebaum | 414/427 |
| 5,577,745 | 11/1996 | Birk | 280/47.19 |

FOREIGN PATENT DOCUMENTS

| 286129 | 6/1931 | Italy | 248/452 |
|---|---|---|---|

*Primary Examiner*—Brian L. Johnson
*Assistant Examiner*—G B Klebe

[57] ABSTRACT

A new chair truck table accessory for allowing erected folding leg tables to be moved. The inventive device includes a front panel has a pair of vertically disposed cleats disposed thereon. A pair of legs extend downwardly from the front panel whereby the front panel is positioned at an acute angle when the pair of legs are placed on a recipient surface. The pair of legs each have a brace extending outwardly therefrom and securing to the opposed long side edges of the front panel. Lower free ends of the pair of legs have a crossmember extending therebetween. A pair of transverse cleats are secured to the front panel.

1 Claim, 2 Drawing Sheets

CHAIR TRUCK TABLE ACCESSORY

BACKGROUND OF THE INVENTION

1. Field of the Invention

The present invention relates to dolly attachments and more particularly pertains to a new chair truck table accessory for allowing erected folding leg tables to be moved.

2. Description of the Prior Art

The use of dolly attachments is known in the prior art. More specifically, dolly attachments heretofore devised and utilized are known to consist basically of familiar, expected and obvious structural configurations, notwithstanding the myriad of designs encompassed by the crowded prior art which have been developed for the fulfillment of countless objectives and requirements.

Known prior art dolly attachments include U.S. Pat. No. 5,163,695 to Pakowsky; U.S. Pat. No. 5,114,118 to Schrader; U.S. Pat. No. 5,017,080 to Thorndike et al.; U.S. Pat. No. 4,934,718 to Voegele; U.S. Pat. No. 5,356,197 to Simic; and U.S. Pat. No. Des. 356,197 to Loughlin.

While these devices fulfill their respective, particular objectives and requirements, the aforementioned patents do not disclose a new chair truck table accessory of the present invention.

The these respects, the chair truck table accessory according to the present invention substantially departs from the conventional concepts and designs of the prior art, and in so doing provides an apparatus primarily developed for the purpose of allowing erected folding leg tables to be moved.

SUMMARY OF THE INVENTION

In view of the foregoing disadvantages inherent in the known types of dolly attachments now present in the prior art, the present invention provides a new chair truck table accessory construction wherein the same can be utilized for allowing erected folding leg tables to be moved.

The general purpose of the present invention, which will be described subsequently in greater detail, is to provide a new chair truck table accessory apparatus and method which has many of the advantages of the dolly attachments mentioned heretofore and many novel features that result in a new chair truck table accessory which is not anticipated, rendered obvious, suggested, or even implied by any of the prior art dolly attachments, either alone or in any combination thereof.

To attain this, the present invention generally comprises a front panel having a generally rectangular configuration, and an upper surface and a lower surface. The front panel has an upper short edge oriented toward a rear of the front panel, a lower short edge oriented toward a front of the front panel, and opposed long side edges extending between the front and rear of the panel. The front panel has a rectangular opening therethrough. The front panel has a pair of cleats mounted on the lower surface of the front panel at a location between the rectangular opening and the lower short edge. A pair of legs extend from the upper short edge of the front panel in an orientation such that the front panel 12 and the pair of legs 18 form an acute angle therebetween. The pair of legs each have a brace extending between the leg and one of the long side edges of the front panel. The legs have free ends coupled to a crossmember extending between the free ends. The crossmember has a pair of cleats, with each cleat being mounted on an opposite free end of the crossmember. A pair of cleats are secured to the upper surface of the front panel. A first transverse cleat is secured to the upper surface of the front panel and extends between the side edges of the front panel, and is located generally between the upper short edge of the front panel and the rectangular opening. A second transverse cleat is secured to the lower surface of the front panel between the lower short edge and the rectangular opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new chair truck table accessory apparatus and method which has many of the advantages of the dolly attachments mentioned heretofore and many novel features that result in a new chair truck table accessory which is not anticipated, rendered obvious, suggested, or even implied by any of the prior art dolly attachments, either alone or in any combination thereof.

It is another object of the present invention to provide a new chair truck table accessory which may be easily and efficiently manufactured and marketed.

It is a further object of the present invention to provide a new chair truck table accessory which is of a durable and reliable construction.

An even further object of the present invention is to provide a new chair truck table accessory which is susceptible of a low cost of manufacture with regard to both materials and labor, and which accordingly is then susceptible of low prices of sale to the consuming public, thereby making such chair truck table accessory economically available to the buying public.

Still yet another object of the present invention is to provide a new chair truck table accessory which provides in the apparatuses and methods of the prior art some of the advantages thereof, while simultaneously overcoming some of the disadvantages normally associated therewith.

Still another object of the present invention is to provide a new chair truck table accessory for allowing erected folding leg tables to be moved.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
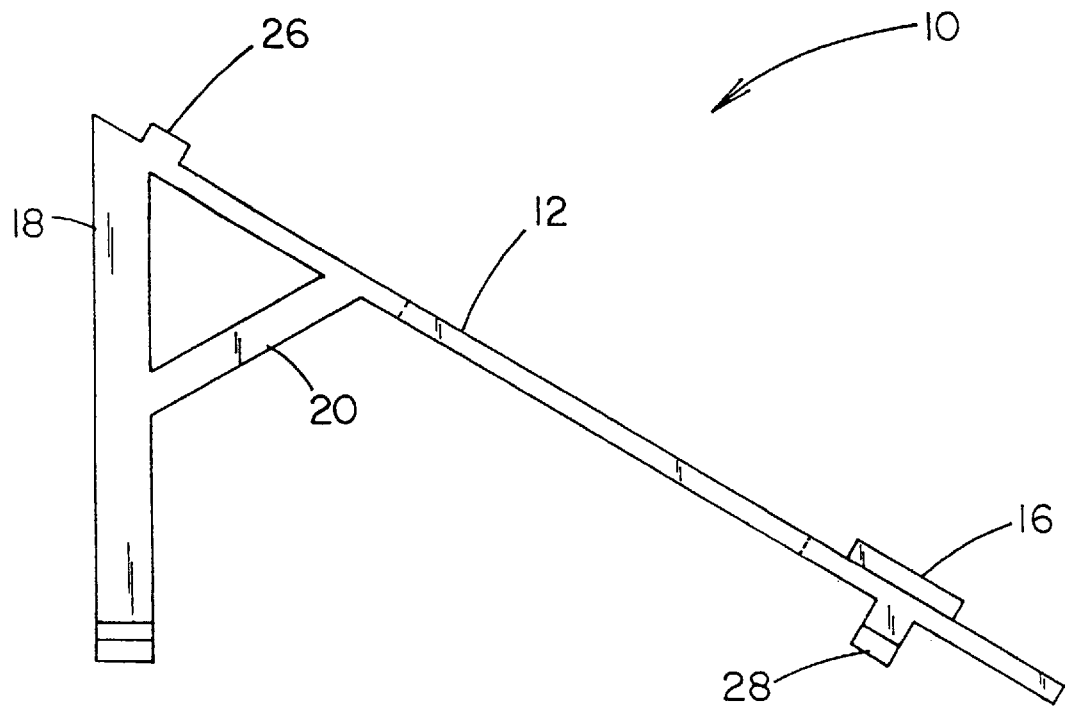
FIG. 1 is a side elevation view of a new chair truck table accessory according to the present invention.
Figure 2:
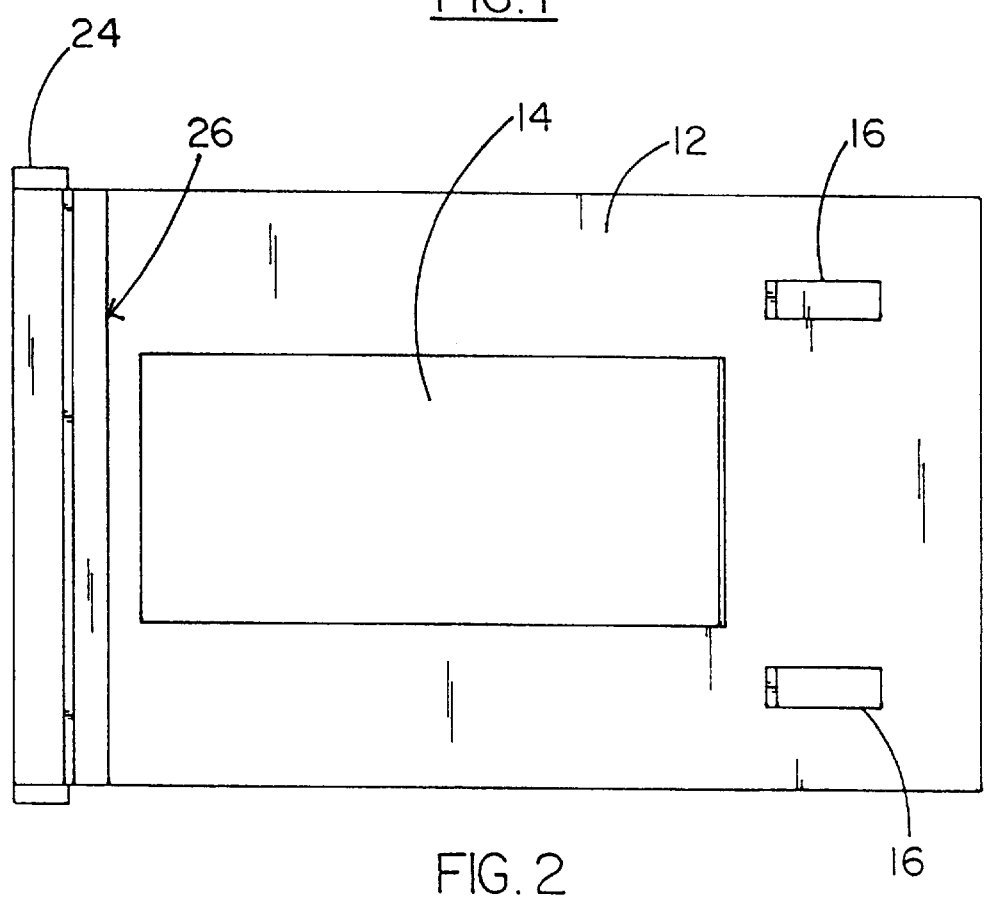
FIG. 2 is a top plan view of the present invention.
Figure 3:
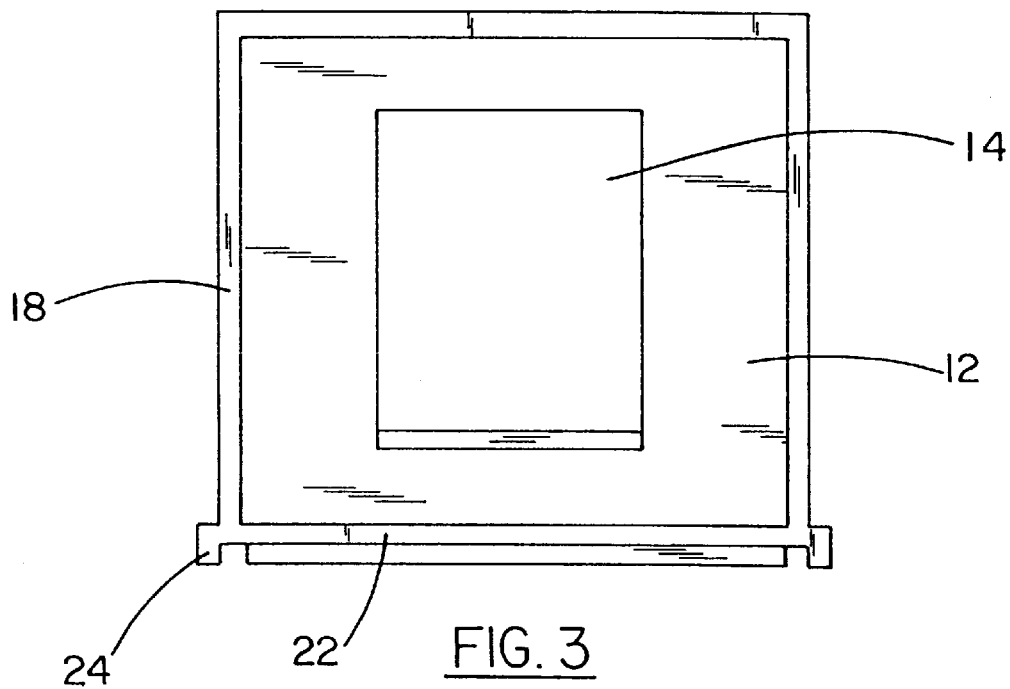
FIG. 3 is a rear elevation view of the present invention.
Figure 4:
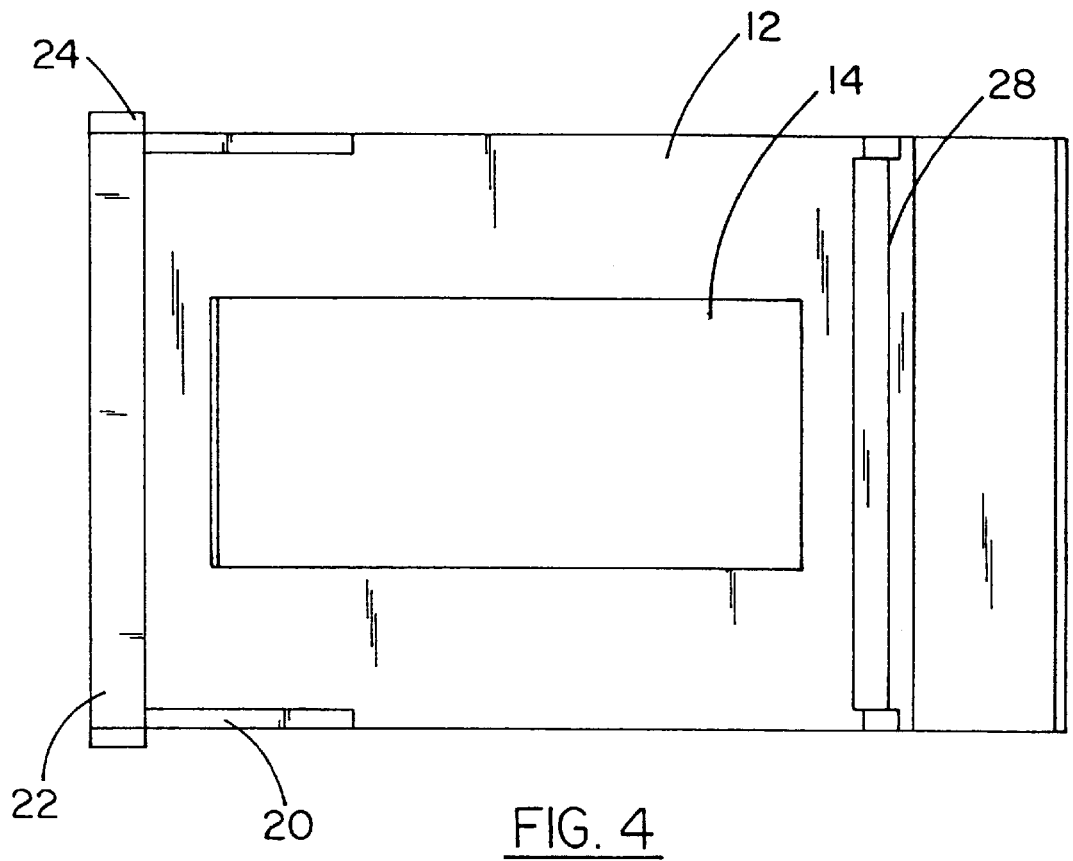
FIG. 4 is a bottom plan view of the present invention.

With reference now to the drawings, and in particular to FIGS. 1 through 4 thereof, a new chair truck table accessory embodying the principles and concepts of the present invention and generally designated by the reference numeral 10 will be described.

As best illustrated in FIGS. 1 through 4, the chair truck table accessory 10 comprises a front panel 12 having a generally rectangular configuration and having upper and lower surfaces. The front panel 12 has an upper short edge toward a rear of the front panel a lower short edge toward a front of the front panel, and opposed long side edges extending between the front and rear of the front panel. The front panel 12 has a rectangular opening 14 therethrough. The front panel 12 has a pair of cleats 16 mounted on the upper surface of the front panel and being positioned generally between the rectangular opening and the lower short end of the front panel.

A pair of legs 18 extend from the lower surface and the upper short edge of the front panel 12 in an orientation such that the front panel 12 and the pair of legs 18 form an acute angle therebetween. The pair of legs 18 each have a brace 20 extending between the leg and one of the long side edges of the front panel 12. Lower free ends of the pair of legs 18 have a crossmember 22 extending between the lower free ends. The crossmember 22 has a pair of cleats 24 mounted on opposing free ends of the crossmember.

A pair of transverse cleats are secured to the upper surface of the front panel 12. A first transverse cleat 26 is secured to the upper surface of the front panel 12 and is positioned generally between the upper short edge and the rectangular opening 14. A second transverse cleat 28 is secured to the lower surface of the front panel 12 generally between the lower short edge and the rectangular opening 14.

In use, the device 10 is a specialized accessory for stacking chairs industrial truck designs that would be especially configured for moving elongated folding-leg-style tables. Specifically, it would permit such tables to be moved around while in a set-up configuration. To use, a chair truck equipped with this device 10 would merely be maneuvered into position under the center of the table to be moved. Pivoting the truck would cause the front panel 12 to come up flush against the underside of the table. At the same time, the table would be raised off the ground by a few inches. The chair truck could then be used to move the table to the desired location.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An accessory for allowing erected folding leg tables to be moved comprising, in combination:

a front panel having a generally rectangular configuration and an upper surface for orienting upward and a lower surface for orienting downward, the front panel having an upper short edge located at a rear of the front panel, a lower short edge located at a front of the front panel and longitudinally spaced from the upper short edge, and laterally spaced long side edges extending between the front and rear of the front panel, the front panel having a rectangular opening therethrough, the front panel having a pair of cleats disposed on the upper surface generally between the lower short edge and the rectangular opening;

a pair of legs extending from the lower surface of the front panel adjacent the upper short edge of the front panel, the legs extending in an orientation such that the front panel and the pair of legs form an acute angle therebetween in a fixed orientation with respect to each other, the pair of legs each having a brace extending from the leg to the opposed one of the long side edge of the front panel, lower free ends of the pair of legs having a crossmember extending between the lower free ends, the crossmember having a pair of cleats disposed on opposing free ends of the crossmember; and a pair of transverse cleats secured to the front panel and extending generally parallel to the upper and lower short edges, a first transverse cleat being secured to the upper surface of the front panel and disposed generally between the upper short edge and the rectangular opening, a second transverse cleat being secured to the lower surface of the front panel generally between the upper short edge and the rectangular opening and a pair of laterally spaced cleats mounted on the lower surface of the front panel generally between the lower short edge and the rectangular opening.

* * * * *